United States Patent

Moon

[11] Patent Number: 6,002,711
[45] Date of Patent: Dec. 14, 1999

[54] SPREAD SPECTRUM COMMUNICATION SYSTEM FOR ERROR COMPENSATION OF CARRIER FREQUENCY

[75] Inventor: Hi-Chan Moon, Migeum, Rep. of Korea

[73] Assignee: Samsung Electronics Co., Ltd., Rep. of Korea

[21] Appl. No.: 08/667,021

[22] Filed: Jun. 20, 1996

[30] Foreign Application Priority Data

Jun. 20, 1995 [KR] Rep. of Korea ................ 95/16472

[51] Int. Cl.[6] .............................. H04K 1/00; H01L 27/14; H01L 27/22
[52] U.S. Cl. ........................... 375/208; 375/274; 375/283
[58] Field of Search .................... 375/206, 208, 375/355, 343, 283, 279, 274, 305, 330, 336, 309

[56] References Cited

U.S. PATENT DOCUMENTS

| | | | |
|---|---|---|---|
| 5,488,629 | 1/1996 | Takahashi et al. | 375/206 |
| 5,504,774 | 4/1996 | Takai et al. | 375/204 |
| 5,506,862 | 4/1996 | McIntosh | 375/200 |
| 5,729,570 | 3/1998 | Magill | 375/206 |
| 5,745,528 | 4/1998 | Hikoso et al. | 375/206 |

*Primary Examiner*—Tesfaldet Bocure
*Attorney, Agent, or Firm*—Dilworth & Barrese

[57] ABSTRACT

A transmitter and a receiver of a spread spectrum communication system for compensating carrier frequency offsets between the transmitter and the receiver. The transmitter includes: a first multiplier for multiplying a pseudo noise signal and input data intended for transmission; a differential encoder for differentially encoding a signal outputted from the first multiplier; a modulator for modulating a signal outputted from the differential encoder; a second multiplier for multiplying the signal modulated by the modulator and a transmitting carrier and for outputting a spread spectrum signal; and an antenna for propagating the spread spectrum signal in the air. The receiver includes: a generator for generating a receiving carrier corresponding to a frequency offset signal; a first multiplier for multiplying a spread spectrum signal received from the transmitter and the receiving carrier and outputting the multiplied signal as a first low frequency signal; a second multiplier for multiplying the spread spectrum signal by a modified carrier in which the receiving carrier is modified by a given phase, and outputting the multiplied signal as a second low frequency signal; a differential detector for detecting a phase rotation amount between each complex digital signals; a correlator for correlating a pseudo noise code with the phase rotation detected by the differential detector; and a frequency offset measurer for measuring a frequency offset between the spread spectrum signal and the receiving carrier by using the signal from the correlator and outputting the frequency control signal for adjusting the receiving carrier signal.

13 Claims, 2 Drawing Sheets

SPREAD SPECTRUM COMMUNICATION SYSTEM FOR ERROR COMPENSATION OF CARRIER FREQUENCY

BACKGROUND OF THE INVENTION

1. Field of the Invention

The present invention relates to a spread spectrum communication system and, in particular, to a spread spectrum communication system for compensating an error of a carrier frequency.

The spread spectrum communication system according to the present invention is based on Korean Application No. 16472/1995, which is incorporated herein by reference.

2. Description of the Related Art

In general, upon transmitting data in a spread spectrum communication system, a transmitter sequentially modulates the data, multiplies the modulated signal by a carrier generated from a local oscillator, converts the multiplied signal into a high frequency signal of a desirable band, and transmits the converted signal. Conversely, upon receiving the data in the spread spectrum communication system, a receiver multiplies a received signal by the carrier from a local oscillator, converts the multiplied signal into a signal of a band adequate for demodulation, and demodulates the converted signal by a demodulator.

At this point, in the case that the carrier of the spread spectrum communication system has no exact frequency value, a signal applied to the demodulator causes a frequency offset of as much as $\Delta f$ due to errors or offsets between the carrier frequency of the transmitter and the carrier frequency of the receiver. Since such frequency offset negatively affects the operation of the receiver in accurately restoring or receiving the transmitted data, there is a need for minimizing the frequency offset.

An automatic frequency control circuits for measuring the frequency offset and automatically controlling the frequency of the received signal have previously been used in spread spectrum communication systems. In such use, most automatic frequency control circuits were designed to control the frequency of the signal having a phase shift per symbol in a range below $2\pi$. However, if the automatic frequency control circuits were used in a spread spectrum communication system in which the phase shift generated the frequency offset adjacent to $2\pi$ or more than $2\pi$, a problem existed in that the frequency offset of the received signal could not be removed.

To overcome the above problem, a high precision local oscillator may be used to limit the frequency offset, but a high precision local oscillator is generally expensive.

Therefore, a need exists for a spread spectrum communication system for limiting the effects of frequency offsets regardless of the type of the local oscillator used in the spread spectrum communication system.

SUMMARY OF THE INVENTION

It is therefore an object of the present invention to provide a transmitter and a receiver of a spread spectrum communication system for compensating carrier frequency offsets.

The above object can be achieved according to the present invention with a transmitter of a spread spectrum communication system for compensating an error of a carrier frequency, comprising: a first multiplier for multiplying a pseudo noise signal with data intended for transmission; a differential encoder for differentially encoding the signal outputted from the first multiplier; a modulator for modulating the signal outputted from the differential encoder; a second multiplier for multiplying the modulated signal and a transmitting carrier and outputting a spread spectrum signal; and an antenna for propagating the spread spectrum signal.

Further, the present invention can be accomplished with a receiver of a spread spectrum communication system for compensating an error of a carrier frequency, comprising: a generator for generating a receiving carrier corresponding to a frequency offset signal; a first multiplier for multiplying a spread spectrum high frequency signal received by the receiver and the receiving carrier and outputting a first multiplied signal as a first low frequency signal; a second multiplier for multiplying the high frequency signal and a modified receive carrier which is phase-modified by a given phase, and outputting a second multiplied signal as a second low frequency signal; a signal converter for converting the first and second low frequency signals, respectively, as first and second digital signals by sampling in accordance with a control signal; a differential detector for detecting a phase rotation amount between each complex digital signals; a correlator for correlating a pseudo noise code with the phase rotation detected by the differential detector; an acquisition tracker for generating the control signal for tracking the received signal; and a frequency offset measurer for measuring a frequency offset between the high frequency signal and the receiving carrier with reference to a signal from the correlator and outputting the frequency offset signal to adjust the frequency of the receiving carrier.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
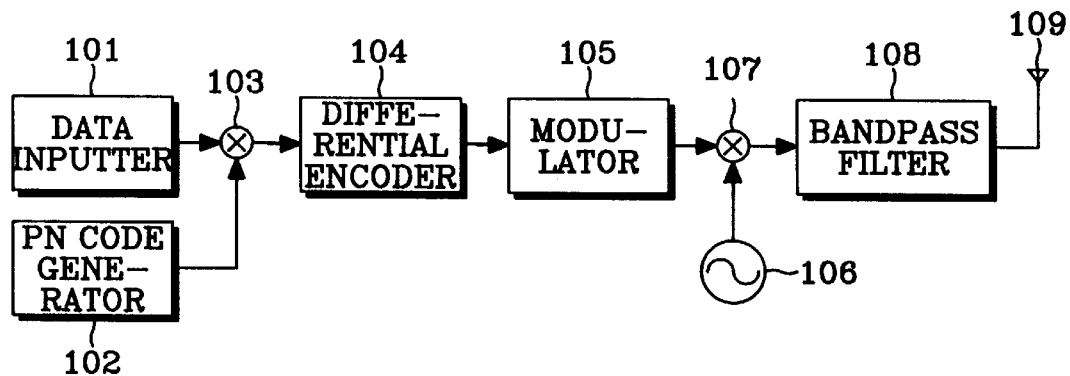
FIG. 1 is a block diagram illustrating a transmitter of a spread spectrum communication system according to the present invention.

Throughout the drawings, it is noted that same reference numerals designate like or equivalent elements having the same function. Further, in the following description, numerous specific details are set forth to provide a more thorough understanding of the present invention. It will be apparent, however, to one skilled in the art that the present invention may be practiced without these specific details. The detailed description on known function and constructions unnecessarily obscuring the subject matter of the present invention will be avoided in the present invention.

FIG. 1 is a block diagram illustrating a transmitter of a spread spectrum communication system according to the present invention.

Referring to FIG. 1, data for transmission which is applied from a data inputter 101 is multiplied by a PN code generated from a pseudo noise (PN) code generator 102 in a first multiplier 103. Here, a signal multiplied in the first multiplier 103 is represented as a spread spectrum signal. The above spread spectrum signal is differentially encoded through a differential encoder 104 and an output of the differential encoder 104 is modulated through a modulator 105. A local oscillator 106 generates a carrier for converting the modulated signal into a signal of a desirable band and a second multiplier 107 multiplies the carrier by the signal outputted from the modulator 105. After bandpass filtering by a bandpass filter 108, such signal is propagated as a spread spectrum high frequency signal by an antenna 109 through the transmission medium such as in the air.

It is apparent to one skilled in the art that the differential encoder 104 can be omitted if modulating methods having inherent differential modulation properties are used, such as in MSK (minimum shift keying) and PSK (phase shift keying).

Figure 2:
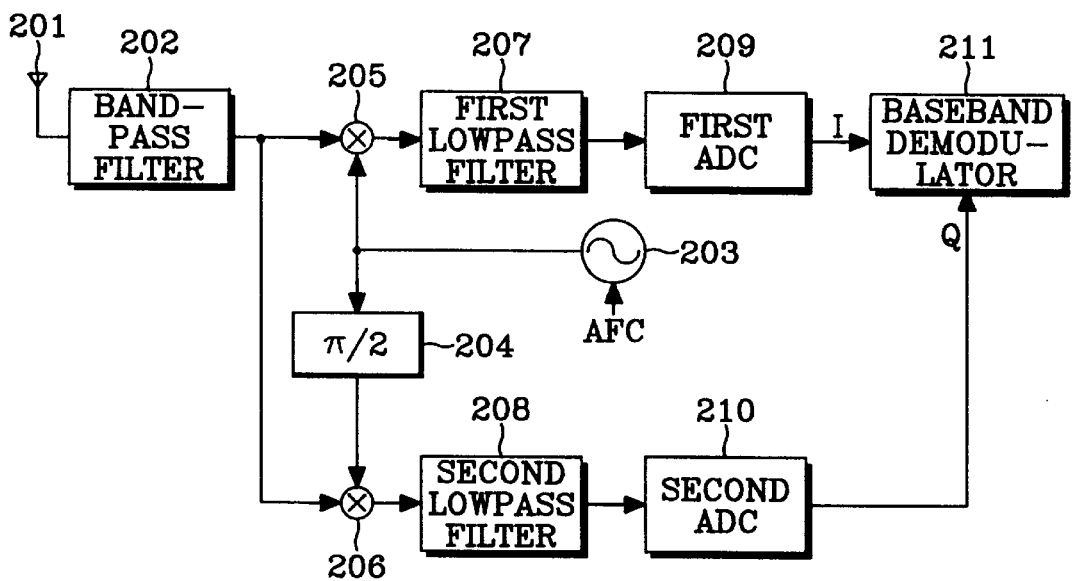
FIG. 2 is a block diagram illustrating a receiver of a spread spectrum communication system according to the present invention.

The signal propagated from the transmitter of the spread spectrum communication system as shown in FIG. 1 is received by the receiver of the spread spectrum communication system as shown in FIG. 2.

In connection with FIG. 2, the spread spectrum high frequency signal received from an antenna 201 is filtered as a signal of an undesirable band by a bandpass filter 202. The signal outputted from the bandpass filter 202 is multiplied by a carrier generated in a local generator 203 in a first multiplier 205, thereby being converted as a first low frequency signal. Such first low frequency signal is passed through a first lowpass filter 207 for removing the signal of undesirable band, then to be converted as a digital signal I in a first ADC (analog/digital converter) 209.

Also, the carrier generated in the local oscillator 203 is applied to a second multiplier 206 through a phase converter 204. The carrier phase may be rotated by as much as around $\pi/2$ by the phase converter 204. Then, the second multiplier 206 multiplies the signal outputted from the bandpass filter 202 by the signal outputted from the phase converter 204, thereby outputting the multiplied signal as a second low frequency signal. After its undesirable band is removed by a second lowpass filter 208, such low frequency signal is applied to a second ADC 210, then to be converted as a digital signal Q.

Figure 3:
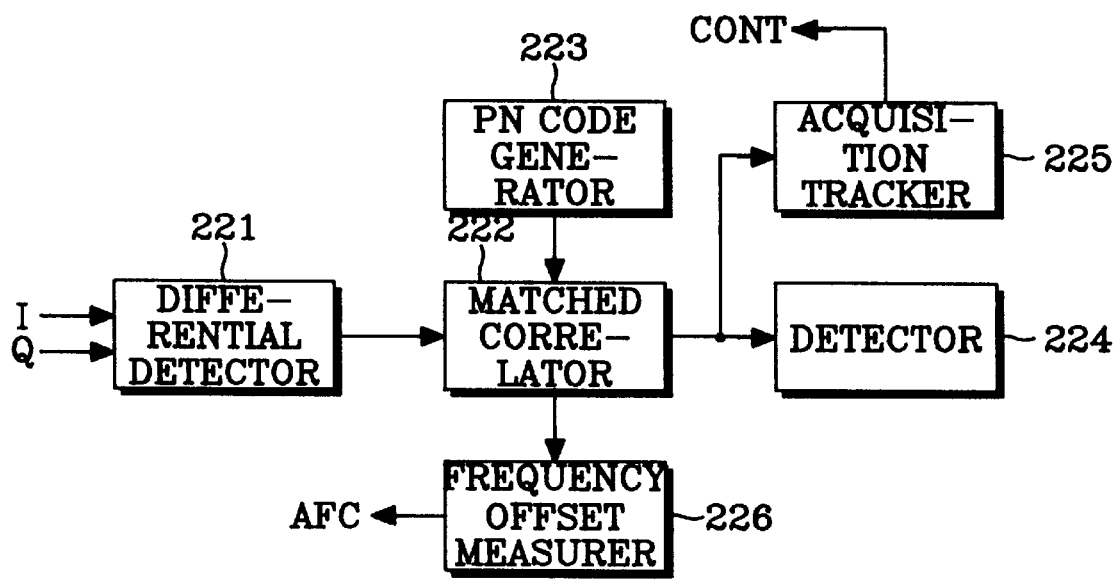
FIG. 3 is a diagram illustrating in further detail the baseband demodulator of FIG. 2.

The I and Q digital signals of the baseband converted as mentioned previously are applied to a baseband demodulator 211, which is illustrated in FIG. 3 in further detail.

As depicted in FIG. 3, a differential detector 221 compares a phase between the current complex signals I and Q outputted from first and second ADCs 209 and 210, with a phase between phase early signals I and Q outputted by a period of one chip, thereby outputting the compared value. The compared value is correlated with the PN code generated from a PN code generator 223 by a correlator 222, thereby being applied to a detector 224 and restored as the received data.

An acquisition tracker 225 outputs a control signal CONT for time tracking of the received signal, with using the output of the correlator 222.

Further, a frequency offset measurer 226 measures a frequency offset between the signal received through the antenna 201 of FIG. 2 and the carrier generated from the local oscillator 203, with using the output of the correlator 222, thereby outputting a frequency offset signal AFC from the measured frequency offset error. Here, AFC is used to adjust the carrier generated from the local oscillator 203 and to minimize the frequency difference between the received signal and the carrier.

In demodulations in prior art spread spectrum communication system which the correlator in the demodulator is positioned before the differential detector, and thus plays a role in filtering the spread spectrum signal as a narrow band signal with using the PN code applied, the prior art differential detector calculates the phase shift between the current signal and the early signal by a period of one symbol. Therefore, if there exists a frequency offset of $\Delta f$, a maximum phase error $\Delta \phi$ generated during one symbol time can be seen from the following expression (1).

$$\Delta\phi=(2\pi\Delta f)T=(2\pi\Delta f)/R \tag{1}$$

Herein, in the above expression (1), T is designated as one symbol time and R is designated as the number of symbols transmitted per second.

According to the expression (1), if the frequency error of $\Delta f$ is about R, the measured phase rotation between the symbol intervals is around $2\pi$.

Supposing, for example, that the number of the symbols transmitted per second, i.e., R represents 80 Ksps and the local oscillator of both the transmitter and receiver has the precision of 50 ppm in the frequency bandpass of 915 MHz, the prior art spread spectrum communication system can generate the maximum phase error of $(2\pi\Delta f)/R=2.3\pi$. Such phase error value causes a frequency offset which may not be removable by most automatic frequency control circuits. As a result, the usage of local oscillators having precision of more than 50 ppm may be required.

In contrast, the receiver as set forth in FIGS. 2 and 3 performs not the differential detection per symbol but the differential detection per one chip of the spread spectrum signal, thereby obtaining a narrow band signal. Due to the above reason, the maximum phase offset generated per one chip can be seen from the following expression (2).

$$\Delta\phi=(2\pi\Delta f)Tc=(2\pi\Delta f)/(PG*R) \tag{2}$$

Herein, Tc is designated as a time area of one chip and PG is designated as a processing gain of the spread spectrum communication system.

As can be seen from the above expression (2), unlike the prior art method as illustrated in the expression (1), the maximum phase error for the frequency offset may be reduced by as much as the processing gain.

As may be apparent from the foregoing, the present invention can be embodied with the spread spectrum communication system which can perform the differential detection at intervals of each chip time. As a result, it is advantageous to enable the received data to be restored effectively without using the local oscillator of the high precision.

Meanwhile, although a preferred embodiment of the process of the present invention has been described in detail hereinabove, it should be clearly understood by those skilled in the art that various changes and modifications may be substituted for elements thereof without departing from the true scope of the present invention as defined in the appended claims.

What is claimed is:

1. A spread spectrum communication system for compensating carrier frequency offset, comprising:

a transmitter comprising:

a first multiplier for multiplying a pseudo noise signal and data intended for transmission;

a differential encoder for differentially encoding said signal from said first multiplier and outputting a differentially encoded signal;

a modulator for modulating a signal from said differential encoder;

a second multiplier for multiplying said signal modulated by said modulator and a transmitting carrier and outputting a spread spectrum signal; and an antenna for propagating said spread spectrum signal; and a receiver comprising:
- a generator for generating a receiving carrier corresponding to a frequency offset signal;
- means for multiplying a spread spectrum high frequency received signal and said receiving carrier and outputting a first multiplier signal as a first low frequency signal, said means for multiplying further multiplying said spread spectrum signal by a modified carrier wherein said receiving carrier is modified by a given phase and outputting a second multiplier signal as a second low frequency signal, said first low frequency signal and said second low frequency signal representing a complex signal;
- a differential detector, said differential detector being responsive to said complex signal and providing a phase error signal corresponding to a phase error between the complex signal of a prior chip time and the current complex signal;
- a correlator for correlating a pseudo noise code with said phase error signal, said correlator providing a correlation output signal from said correlating; and
- a frequency offset measurer for measuring a frequency error between said spread spectrum signal and said receiving carrier by applying said correlation signal and outputting said frequency offset signal from said measured frequency error.

2. The transmitter according to claim 1, wherein said modulator differentially modulates said signal outputted from said multiplier in one of minimum shift keying (MSK) and phase shift keying (PSK) modulation.

3. The system according to claim 1 wherein said pseudo noise codes of said transmitter and receiver are substantially the same.

4. The system according to claim 1, further including a signal converter for converting said first and second low frequency signals, respectively, as first and second digital signals by a unit of sampling determined in accordance with a control signal; and a acquisition tracker for generating said control signal for sampling of said first and second low frequency signals by using a signal outputted from said correlator.

5. The system according to claim 1 wherein said modified carrier is modified by a phase of about π/2.

6. The system according to claim 1 wherein said means for multiplying includes a first multiplier for multiplying said spread spectrum high frequency received signal and said receiving carrier, and a second multiplier for multiplying said spread spectrum signal by said modified carrier.

7. A receiver of a spread spectrum communication system for compensating carrier frequency offset, comprising:
- a generator for generating a receiving carrier corresponding to a frequency offset signal;
- a first multiplier for multiplying a spread spectrum signal received and said receiving carrier and outputting said first multiplier signal as a first low frequency signal;
- a second multiplier for multiplying said spread spectrum signal by a modified carrier wherein said receiving carrier is modified by a given phase, and outputting said second multiplier signal as a second low frequency signal, said first low frequency signal and said second low frequency signal representing a complex signal;
- a differential detector, said differential detector being responsive to said complex signal and providing a phase error signal corresponding to a phase error between the complex signal of a prior one chip time and the current complex signal;
- a correlator for correlating a pseudo noise code with said phase error signal, said correlator providing a correlation output signal from said correlating; and
- a frequency offset measurer for measuring a frequency error between said spread spectrum signal and said receiving carrier by applying said correlation signal and outputting said frequency offset signal from said measured frequency error.

8. The receiver according to claim 7, wherein said given phase is around π/2.

9. The receiver according to claim 7, further including:
- a signal converter for converting said first and second low frequency signals, respectively, as first and second digital signals by a unit of sampling determined in accordance with a control signal; and
- an acquisition tracker for generating said control signal for sampling of said first and second low frequency signals by using a signal outputted from said correlator.

10. A spread spectrum communication system comprising:
- a transmitter having: a first multiplier for multiplying a pseudo noise code and baseband data; a differential encoder for differentially encoding a product signal from said first multiplier; a modulator for modulating said differentially encoded signal; and a second multiplier for multiplying said modulated signal with a transmitting carrier signal and for outputting a spread spectrum signal; and
- a receiver having: a generator for generating a receiving carrier corresponding to a frequency offset signal;
- a first multiplier for multiplying a spread spectrum high frequency signal received and said receiving carrier and outputting said first multiplier signal as a first low frequency signal;
- a second multiplier for multiplying said spread spectrum signal by a modified carrier wherein said receiving carrier is modified by a given phase, and outputting said second multiplier signal as a second low frequency signal, said first low frequency signal and said second; low frequency signal representing a complex signal;
- a differential detector, said differential detector being responsive to said complex signal and providing a phase error signal corresponding to a phase error between the complex signal of a prior chip time and the current complex signal;
- a correlator for correlating a psuedo noise code with said phase error signal, said correlator providing a correlation output signal from said correlating; and
- a frequency offset measurer for measuring a frequency error between said spread spectrum signal and said receiving carrier by applying said correlation signal and outputting said frequency offset signal from said measured frequency error.

11. The system according to claim 10 wherein said pseudo noise codes of said transmitter and receiver are substantially the same.

12. The system according to claim 10, further including a signal converter for converting said first and second low frequency signals, respectively, as first and second digital signals by a unit of sampling determined in accordance with a control signal; and an acquisition tracker for generating said control signal for sampling of said first and second low frequency signals by using a signal outputted from said correlator.

13. The system according to claim 10 wherein said modified carrier is modified by a phase of about π/2.

* * * * *